United States Patent

Ohkoshi et al.

[11] Patent Number: 5,945,487
[45] Date of Patent: Aug. 31, 1999

[54] THERMOSETTING POWDER COATING COMPOSITION

[75] Inventors: Toshio Ohkoshi, Atsugi; Yugen Kawamoto; Toshio Ogasawara, both of Hiratsuka; Motoshi Yabuta, Hadano; Koji Yamada, Yokohama, all of Japan

[73] Assignee: Kansai Paint Company, Ltd., Hyogo, Japan

[21] Appl. No.: 08/765,460

[22] PCT Filed: Jul. 24, 1995

[86] PCT No.: PCT/JP95/01469

§ 371 Date: Jan. 23, 1997

§ 102(e) Date: Jan. 23, 1997

[87] PCT Pub. No.: WO96/03464

PCT Pub. Date: Feb. 8, 1996

[30] Foreign Application Priority Data

Jul. 25, 1994 [JP] Japan .................................. 6-193615

[51] Int. Cl.[6] .............................. C08F 16/26; C08F 20/32; C08F 24/00; C08F 116/16
[52] U.S. Cl. ..................... 525/327.3; 525/107; 525/384; 525/327.2; 525/408; 525/117
[58] Field of Search .................................... 525/123, 107, 525/124, 384, 455, 117, 327.2, 327.3, 408

[56] References Cited

FOREIGN PATENT DOCUMENTS

| 0 145 263 A1 | 6/1985 | European Pat. Off. . |
| 0 509 392 A1 | 10/1992 | European Pat. Off. . |
| 0 517 536 A2 | 12/1992 | European Pat. Off. . |
| 0 694 592 A2 | 1/1996 | European Pat. Off. . |
| 4-359971 | 12/1992 | Japan . |
| 5-132634 | 5/1993 | Japan . |

*Primary Examiner*—Patrick D. Niland
*Attorney, Agent, or Firm*—Armstrong, Westerman, Hattori, McLeland & Naughton

[57] ABSTRACT

The invention provides a thermosetting powder coating composition comprising (A) a vinyl copolymer having a number average molecular weight of 1,500 to 6,000, a molecular weight distribution of 1.0 to 1.5 as represented by a weight average molecular weight/a number average molecular weight and a glass transition temperature of 40 to 100° C., the copolymer containing at least one species of functional group selected from the class consisting of epoxy group, carboxyl group and hydroxyl group, and (B) a curing agent. The thermosetting powder coating composition of the invention is superior in any of the finished appearance of coating film and the blocking resistance.

2 Claims, No Drawings

500
THERMOSETTING POWDER COATING COMPOSITION

FIELD OF THE INVENTION

The present invention relates to a novel thermosetting powder coating composition which is excellent in the finished appearance of coating film and in the blocking resistance.

BACKGROUND ART

In recent years, thermosetting powder coating compositions which are usable without a solvent have been increasingly used from the viewpoints of prevention of environmental pollution and conservation of environment.

However, conventional thermosetting powder coating compositions generally have a drawback of giving a coating film which is unsatisfactory in the finished appearance.

To produce powder coating compositions which are free of such drawback and excellent in the finished appearance of coating film, the molecular weight of a vinyl copolymer used as the resin component of the composition has been lowered to reduce the viscosity of the coating composition thermally fused. Yet, the powder coating composition obtained in this way has posed a problem of being likely to cause blocking phenomenon that particles in the composition during storage weld together, thereby forming agglomerates.

DISCLOSURE OF THE INVENTION

An object of the present invention is to provide a novel thermosetting powder coating composition free of the foregoing prior art drawback.

Another object of the invention is to provide a novel thermosetting powder coating composition which is superior in any of the finished appearance of coating film and the blocking resistance.

Other objects and features of the invention will become apparent from the following description.

According to the present invention, there is provided a thermosetting powder coating composition comprising:
(A) a vinyl copolymer having a number average molecular weight of 1,500 to 6,000, a molecular weight distribution of 1.0 to 1.5 as represented by a weight average molecular weight/a number average molecular weight and a glass transition temperature of 40 to 100° C., the copolymer containing at least one species of functional group selected from the class consisting of epoxy group, carboxyl group and hydroxyl group, and
(B) a curing agent.

The present inventors conducted extensive research to overcome the foregoing prior art drawback and found the following. A vinyl copolymer used as the resin component of the composition has generally a molecular weight distribution (represented by a weight average molecular weight/a number average molecular weight) of at least 2, namely too broad of a distribution. Therefore, when the molecular weight of a vinyl copolymer is lowered, the blocking phenomenon would tend to occur in the composition due to the low-molecular-weight compound. The inventors further researched based on the finding and discovered the following. When a copolymer as specified above in number average molecular weight, narrow molecular weight distribution and glass transition temperature and containing the specific functional groups is used as the resin component in a powder coating composition, the resulting powder coating composition is excellent in any of the finished appearance of coating film and the blocking resistance.

The present invention has been completed based on these novel findings.

The vinyl copolymer (A) used as the resin component in the composition of the present invention is 1,500 to 6,000 in number average molecular weight, 1.0 to 1.5, preferably 1.0 to 1.2, in molecular weight distribution as represented by a weight average molecular weight/a number average molecular weight and 40 to 100° C. in glass transition temperature, and contains at least one species of functional group selected from the class consisting of epoxy group, carboxyl group and hydroxyl group.

A copolymer having a number average molecular weight of less than 1,500 tends to lower the blocking resistance of the composition and to impair the film properties such as mar resistance, weatherability, etc., whereas a copolymer higher than 6,000 in number average molecular weight tends to degrade the finished appearance of coating film. Hence the number average molecular weight outside said range is undesirable.

If the molecular weight distribution of the vinyl copolymer as represented by a weight average molecular weight/a number average molecular weight is above 1.5, it would be difficult to obtain a coating composition which is satisfactory in both the finished appearance of the coating film and the blocking resistance.

If the glass transition temperature of the copolymer is below 40° C., a lower blocking resistance is apt to result, whereas if it is above 100° C., the melt flowability would be lowered, thereby tending to degrade the finished appearance of coating film. Hence the glass transition temperature outside said range is undesirable.

At least one species of functional group selected from the class consisting of epoxy group, carboxyl group and hydroxyl group in the copolymer is reacted with the curing agent to accomplish crosslinking. The vinyl copolymer may contain either only one species of these functional groups or a combination of at least two species of the functional groups, e.g. epoxy group and hydroxyl group, or carboxyl group and hydroxyl group.

If the copolymer has epoxy groups, it is desirable that the copolymer have an epoxy equivalent of about 280 to about 950. Preferably the copolymer with carboxyl groups has an acid value of about 30 to about 300 mg KOH/g. Preferably the copolymer with hydroxyl groups has a hydroxyl value of about 30 to about 300 mg KOH/g.

The vinyl copolymer (A) can be prepared, for example, by living polymerization, particularly the living polymerization disclosed in Japanese Examined Patent Publication No.79685/1993, or by fractionating the copolymer produced by radical polymerization to give a specific molecular weight distribution.

When a copolymer is prepared by the living polymerization disclosed in Japanese Examined Patent Publication No.79685/1993, the living polymerization is performed using vinyl monomers, a polymerization initiator capable of forming an active species of a growing terminal, a co-catalyst and optionally a solvent and is terminated by inactivating the terminal with an active hydrogen source such as water, alcohol or the like, whereby the desired copolymer can be formed. In preparing a copolymer having a specially narrow molecular weight distribution, it is preferred to add the monomers in a lump after the reaction components other than the monomers have been supplied.

Examples of useful vinyl monomers are methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, hexyl (meth)

acrylate, cyclohexyl (meth)acrylate, 2-ethylhexyl (meth) acrylate, glycidyl (meth)acrylate, allylglycidyl ether, 3,4-epoxycyclohexyl-methyl (meth)acrylate, trimethylsilyl (meth)acrylate, 2-(trimethylsiloxy)ethyl (meth)acrylate, etc.

In introducing epoxy groups into a copolymer, glycidyl (meth)acrylate, allylglycidyl ether, 3,4-epoxycyclohexyl (meth)acrylate or the like is used as the monomer.

In introducing hydroxyl groups into a copolymer, copolymerization is conducted using, for example, 2-(trimethylsiloxy)ethyl (meth)acrylate as the monomer, and then the group $COOC_2H_4Si(CH_3)_3$ in the side chain of the resulting copolymer is converted into a group $COOC_2H_4OH$ by an alcohol.

In introducing carboxyl groups into a copolymer, copolymerization is conducted using, for example, trimethylsilyl (meth)acrylate as the monomer, and then the group $COOSi(CH_3)_3$ in the side chain of the resulting copolymer is converted into a group COOH by an alcohol.

Examples of useful polymerization initiators are [(1-methoxy-2-methyl-1-propenyl)oxy]trimethylsilane, [(2-methyl-1-propenylidene)bis(oxy)]bis[trimethylsilane], trialkylsilylnitrile, [(2-methyl-1-[2-(trimethylsiloxy)-ethoxy]-1-propenyl)oxy]trimethylsilane, etc.

Useful co-catalysts include, for example, tris(dimethylamino)sulfonium bifluoride, potassium ammonium bifluoride, boron trifluoride etherate, tetraalkyl ammonium bifluoride, tetrabutyl ammonium m-chlorobenzoic acid, tetraaryl phosphonium bifluoride, etc.

The method of giving the specific molecular weight distribution to the vinyl copolymer (A) by fractionation of the copolymer prepared by radical polymerization is as follows.

First, at least one species of monomer selected from the group consisting of an epoxy group-containing ethylenically unsaturated monomer, a hydroxyl-containing ethylenically unsaturated monomer and a carboxyl-containing ethylenically unsaturated monomer, and other radically polymerizable unsaturated monomer are polymerized in the presence of a radical polymerization initiator to give a copolymer.

The obtained copolymer is usually a mixture of substances of various molecular weights having a molecular weight distribution of at least 2 as represented by a weight average molecular weight/a number average molecular weight. The copolymer is fractionated to give a molecular weight distribution of 1.0 to 1.5 by removing the low-molecular-weight substances and high-molecular-weight substances based on the difference of physical or chemical properties between the substances.

Fractionation methods include conventional fractionation methods, for example, a method of fractionation utilizing a phenomenon that when an interaction is varied between the polymer and the solvent by altering the temperature of the polymer solution or the make-up of the solvent, the polymer solution achieves a phase separation into a thick solution and a dilute solution; ultracentrifuge for fractionation according to the degree of sedimentation variable with molecular weights; and molecular sieve method wherein high molecular weight gel particles of three-dimensionally reticulated structure or porous glass spheres are packed into a column and specimens are passed therethrough to achieve fractionation due to a difference in molecular size.

Examples of epoxy group-containing ethylenically unsaturated monomers to be used in said radical polymerization are glycidyl (meth)acrylate, allylglycidyl ether, 3,4-epoxycyclohexylmethyl (meth)acrylate, etc.

Useful hydroxyl-containing ethylenically unsaturated monomers include, for example, hydroxyethyl (meth) acrylate, hydroxypropyl (meth)acrylate, hydroxybutyl (meth)acrylate, etc.

Useful carboxyl-containing ethylenically unsaturated monomers include, for example, (meth)acrylic acid, maleic acid, etc.

Examples of other radically polymerizable unsaturated monomers to be used are alkyl esters or cycloalkyl esters of (meth)acrylic acids such as methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, 2-ethylhexyl (meth)acrylate, cyclohexyl (meth)acrylate, n-octyl (meth)acrylate, lauryl (meth)acrylate, dodecyl (meth)acrylate and stearyl (meth) acrylate; alkoxyalkyl esters of (meth)acrylic acids such as methoxybutyl (meth)acrylate, methoxyethyl (meth)acrylate and ethoxybutyl (meth)acrylate; and vinyl aromatic compounds such as styrene, α-methylstyrene, vinyltoluene, p-chlorostyrene and p-tert-butylstyrene.

Examples of radical polymerization initiators which can be used herein are benzoyl peroxide, di-tert-butylhydroperoxide, azobisdimethyl valeronitrile, azobisisobutyronitrile, etc.

The curing agent (B) to be incorporated into the composition of the invention is a compound which achieves crosslinking by reaction with the epoxy groups, carboxyl groups or hydroxyl groups in the vinyl copolymer (A).

Usable as the curing agent for epoxy groups are, for example, polycarboxylic acids such as adipic acid, azelaic acid, sebacic acid, dodecanoic diacid and eicosanoic diacid, and polycarboxylic anhydrides prepared by dehydration condensation of at least one of these polycarboxylic acids.

Useful as the curing agent for carboxyl groups are, for example, triglycidyl isocyanurate and like polyepoxides, and (bis(N,N')-dihydroxyethyl)adibamide (such as "Primid XL-552", product of Rohm & Haas Co., trade name) and like β-hydroxyalkylamides.

Useful as the curing agent for hydroxyl groups are, for example, ε-caprolactam block products of isophorone diisocyanate (e.g., "Vestagon B-1530", Dicel Hules Co., trade name) and like blocked polyisocyanates, tetramethoxymethyl glycollyl (e.g. "Powderlink 1174", product of Mitsui Cyanamide Co., Ltd., trade name) and like polyalkoxy compounds.

The proportions of the components (A) and (B) in the coating composition of the invention are about 60 to about 92% by weight of the component (A) and about 8 to about 40% by weight of the component (B), based on the combined amount of the two components.

The coating composition of the invention may contain, when required, additives in addition to the components (A) and (B). Examples of such additives are organic coloring pigments such as quinacridone and like quinacridone pigments, pigment red and like azo pigments, Phthalocyanine Blue, Phthalocyanine Green and like phthalocyanine pigments, inorganic coloring pigments such as titanium oxide, carbon black and graphite, extender pigments such as calcium carbonate, barium sulfate, clay, talc and silica, metallic pigments such as micaceous iron oxide and aluminum flake, corrosion-resistant pigments such as red oxide, strontium chromate and zinc phosphate, curing catalysts such as dibutyltin diacetate, dibutyltin dioctate, dibutyltin dilaurate, triethylamine and diethanolamine, UV absorbers such as benzophenone compounds, benzotriazole compounds, salicylate compounds and oxalic acid anilide compounds, UV stabilizers such as hindered amine compounds, surface modifiers and bubbling inhibitors.

The coating composition of the invention can be prepared by fusing, kneading, cooling and pulverizing the vinyl copolymer (A), the curing agent (B), and optionally additives. It is suitable that the obtained powder have an average particle size of about 20 to about 100 µm.

The coating composition of the invention is not particularly limited in applications and can be suitably used as a topcoat composition.

Suitable substrates which are coated with the composition of the invention are those made of metals such as iron, steel, aluminum and zinc, alloys thereof or the like, those treated with zinc phosphate, iron phosphate or the like for chemical conversion and those coated with an undercoat and/or an intercoat.

The coating composition of the invention is suitably applied to the substrate usually by electro-static powder coating method. A proper thickness of coating film when cured is about 10 to about 200 µm. The curing is carried out by heating the composition at a temperature of about 130 to about 200° C. for about 20 to about 60 minutes.

The powder coating composition of the invention shows a remarkable effect of being superior in any of the finished appearance of coating film and the blocking resistance due to the use of the specific vinyl copolymer of the invention as the resin component of the composition.

BEST MODE FOR CARRYING OUT THE INVENTION

The present invention is described below in more detail with reference to Preparation Examples, Examples and Comparative Examples.

Preparation Example 1
Preparation of Vinyl Copolymer a by Living Polymerization Into a separable flask dried in a nitrogen stream was charged 666 g of dehydrated tetrahydrofuran. Added thereto were 87 g of [(1-methoxy-2-methyl-1-propenyl)oxy] trimethylsilane as a polymerization initiator and 17 g of a tetrahydrofuran solution of tetrabutyl ammonium m-chlorobenzoic acid in a concentration of 0.5 mmol/l as a co-catalyst, followed by homogeneously stirring the mixture. Added dropwise was a mixture of 500 g of methyl methacrylate, 150 g of n-butyl methacrylate and 350 g of glycidyl methacrylate over a period of 30 minutes with stirring. The mixture underwent a reaction with cooling until the heat was subdued. Thereafter the mixture was stirred for 20 minutes and 32 g of methanol was added. The mixture was heated to distil off tetrahydrofuran and methanol under reduced pressure, giving a solid epoxy group-containing vinyl copolymer a.

The copolymer a had a glass transition temperature of 68° C. and an epoxy equivalent of 406.

The copolymer a was 2,590 in weight average molecular weight (Mw), 2,280 in number average molecular weight (Mn) and 1.13 in Mw/Mn.

Preparation Example 2
Preparation of Vinyl Copolymer b by Living Polymerization Into a separable flask dried in a nitrogen stream was charged 470 g of dehydrated tetrahydrofuran. Added thereto were 61 g of [(1-methoxy-2-methyl-1-propenyl)oxy] trimethylsilane as a polymerization initiator and 12 g of a tetrahydrofuran solution of tetrabutyl ammonium m-chlorobenzoic acid in a concentration of 0.5 mmol/l as a co-catalyst, followed by homogeneously stirring the mixture. Added dropwise was a mixture of 160 g of methyl methacrylate, 400 g of n-butyl methacrylate and 440 g of trimethylsilyl methacrylate over a period of 50 minutes with stirring. The mixture underwent a reaction with cooling until the heat was subdued. Thereafter the mixture was stirred for 20 minutes and 285 g of methanol was added. The mixture was heated to distil off tetrahydrofuran and methanol under reduced pressure, giving a solid carboxyl-containing vinyl copolymer b.

The trimethylsilyl methacrylate (440 g) was converted with methanol and corresponded to 239 g of methacrylic acid.

The copolymer b had a glass transition temperature of 79° C. and an acid value of 196 mg KOH/g.

The copolymer b was 2,690 in weight average molecular weight (Mw), 2,380 in number average molecular weight (Mn) and 1.13 in Mw/Mn.

Preparation Example 3
Preparation of Vinyl Copolymer c by Living Polymerization Into a separable flask dried in a nitrogen stream was charged 559 g of dehydrated tetrahydrofuran. Added thereto were 73 g of [(1-methoxy-2-methyl-1-propenyl)oxy] trimethylsilane as a polymerization initiator and 12 g of a tetrahydrofuran solution of tetrabutyl ammonium m-chlorobenzoic acid in a concentration of 0.5 mmol/l as a co-catalyst, followed by homogeneously stirring the mixture. Added dropwise was a mixture of 418 g of methyl methacrylate, 126 g of n-butyl methacrylate and 456 g of trimethylsiloxyethyl methacrylate over a period of 40 minutes with stirring. The mixture underwent a reaction with cooling until the heat was subdued. Thereafter the mixture was stirred for 20 minutes and 170 g of methanol was added. The mixture was heated to distil off tetrahydrofuran and methanol under reduced pressure, giving a solid hydroxyl-containing vinyl copolymer c.

The trimethylsiloxyethyl methacrylate (456 g) a was converted with methanol and corresponded to 318 g of hydroxyethyl methacrylate.

The copolymer c had a glass transition temperature of 71° C. and a hydroxyl value of 159 mg KOH/g.

The copolymer c was 2,500 in weight average molecular weight (Mw), 2,240 in number average molecular weight (Mn) and 1.12 in Mw/Mn.

Preparation Example 4
Preparation of Vinyl Copolymer d by Radical Polymerization A 600 g quantity of toluene was charged into a conventional reaction vessel equipped with a stirrer, thermometer, reflux condenser and the like, followed by heating and stirring. When toluene started to be refluxed, 350 g of glycidyl methacrylate, 150 g of n-butyl methacrylate, 500 g of methyl methacrylate, and 40 g of azobisisobutyronitrile were added dropwise over a period of about 2 hours. After completion of addition, a reflux continued for a further 3 hours, and 10 g of azobisisobutyronitrile was added, followed by 1 hour's reflux. After termination of the reflux, the toluene was discharged outside the reaction vessel. When the temperature of the contents of the reaction vessel reached 150° C., the residual toluene was removed by vacuum distillation, and the residue was cooled, giving a solid epoxy group-containing vinyl copolymer d.

The copolymer d had a glass transition temperature of 79° C. and an epoxy equivalent of 405.

The copolymer d was 4,670 in weight average molecular weight (Mw), 2,310 in number average molecular weight (Mn) and 2.02 in Mw/Mn.

Preparation Example 5
Preparation of Vinyl Copolymer e by Radical Polymerization The procedure of Preparation Example 4 was repeated with the exception of using azobisisobutyronitrile in an amount altered from 40 g to 30 g, giving a solid epoxy group-containing vinyl copolymer e.

The copolymer e had a glass transition temperature of 68° C. and an epoxy equivalent of 406.

The copolymer e was 8,650 in weight average molecular weight (Mw), 3,040 in number average molecular weight (Mn) and 2.85 in Mw/Mn.

Preparation Example 6
Preparation of Vinyl Copolymer f by Radical Polymerization The procedure of Preparation Example 4 was repeated with the exception of using 300 g of methacrylic acid, 500 g of n-butyl methacrylate and 300 g of methyl methacrylate as the monomer components, giving a solid carboxyl-containing vinyl copolymer f.

The copolymer f had a glass transition temperature of 79° C. and an acid value of 196 mg KOH/g.

The copolymer f was 4,820 in weight average molecular weight (Mw), 2,300 in number average molecular weight (Mn) and 2.10 in Mw/Mn.

Preparation Example 7
Preparation of Vinyl Copolymer g by Radical Polymerization The procedure of Preparation Example 4 was repeated with the exception of using 369 g of hydroxyethyl methacrylate, 146 g of n-butyl methacrylate and 485 g of methyl methacrylate as the monomer components, giving a solid hydroxyl-containing vinyl copolymer g.

The copolymer g had a glass transition temperature of 71° C. and a hydroxyl value of 159 mg KOH/g.

The copolymer g was 4,730 in weight average molecular weight (Mw), 2,350 in number average molecular weight (Mn) and 2.01 in Mw/Mn.

EXAMPLES 1–3 AND COMPARATIVE EXAMPLES 1–4

Vinyl copolymers and curing agents used according to the make-up as shown in Table 1 were dry-blended at room temperature using a Henschel mixer. The blend of components was fused and kneaded in an extruder, cooled, finely divided by Pinding's mill and passed through a 150 mesh sieve, giving a powder coating composition according to the invention or a comparative powder coating composition.

TABLE 1

|  |  | Example | | | Comparative Example | | | |
|---|---|---|---|---|---|---|---|---|
|  |  | 1 | 2 | 3 | 1 | 2 | 3 | 4 |
| Vinyl Copolymer | a | 80 | | | | | | |
|  | b | | 91 | | | | | |
|  | c | | | 77 | | | | |
|  | d | | | | 80 | | | |
|  | e | | | | | 80 | | |
|  | f | | | | | | 91 | |
|  | g | | | | | | | 77 |
| Curing agent | (1) | 20 | | | 20 | 20 | | |
|  | (2) | | 9 | | | | 9 | |
|  | (3) | | | 23 | | | | 23 |

In Table 1, the curing agent (1) was a dodecanoic diacid, the curing agent (2) was triglycidyl isocyanate, and the curing agent (3) was "Vestagon B-1530" (block polyisocyanate, product of Dicel Hules Co., trade name).

Formation of Coating Film

Coating films were formed by a 2-coat 2-bake coating method as described below using as a clear topcoat composition the powder coating compositions prepared in Examples and Comparative Examples.

An epoxy cationic electrodepositable coating composition was electrodeposited to a thickness of about 20 μm when cured on a dull steel panel of 0.8 mm thickness treated with zinc phosphate for chemical conversion, and was baked. "Magicron HM-22" (product of Kansai Paint Co., Ltd., acryl-melamine metallic coating composition, trade name) was applied to the electro-deposit to form a base coat having a thickness of about 15 μm when cured and was heated for curing at 140° C. for 30 minutes.

Each of said powder coating compositions was applied to the base coat by electrostatic coating to a thickness of about 70 μm when cured and was heated for curing at 160° C. for 30 minutes, giving a coating film.

Performance Test

The powder coating compositions prepared above were checked for blocking resistance, finished appearance of cured coating and gloss thereof by the following methods.

Blocking resistance of powder coating composition: Each powder coating composition was placed into a cylindrical container having a bottom area of about 20 cm² to a height of 6 cm and left to stand at 30° C. for 7 days. Thereafter the composition was withdrawn and observed to check the condition for evaluation according to the following criteria. A: No agglomerate was found. B: Agglomerates like rice grains were found. C: Hardened into a mass in the shape of the container.

Finished appearance of coating film: The coating film was visually inspected and rated in the finished appearance according to the following criteria: A; Very good, B; Good, C; Impaired Gloss: The specular reflectivity (%) was determined at an angle of 60°. The test results are shown in Table 2.

TABLE 2

|  | Example | | | Comparative Example | | | |
|---|---|---|---|---|---|---|---|
|  | 1 | 2 | 3 | 1 | 2 | 3 | 4 |
| Blocking resistance of powder coating composition | A | A | A | C | A | C | C |
| Appearance of coating | A | A | A | B | C | B | B |
| Gloss | 93 | 90 | 91 | 93 | 85 | 90 | 90 |

We claim:
1. A thermosetting powder coating composition comprising:
   (A) a vinyl copolymer prepared by living polymerization and having a number average molecular weight of 1,500 to 6,000, a molecular weight distribution of 1.0 to 1.5 as represented by a weight average molecular weight/a number average molecular weight and a glass transition temperature of 40 to 100° C., the copolymer containing epoxy groups as functional groups, and
   (B) a polycarboxylic acid or a polycarboxylic anhydride as a curing agent.

2. The thermosetting powder coating composition according to claim 1 wherein the proportions of the components (A) and (B) are about 60 to about 92% by weight of the component (A) and about 8 to about 40% by weight of the component (B), based on the combined amount of the two components.

* * * * *